United States Patent

Hazinski et al.

[11] Patent Number: 5,407,291
[45] Date of Patent: Apr. 18, 1995

[54] WIRE CONNECTOR AND METHOD

[75] Inventors: Daniel P. Hazinski, Ft. Lauderdale; Sidney Samole, Miami, both of Fla.

[73] Assignee: Pop-Tent, Inc., Miami, Fla.

[21] Appl. No.: 191,364

[22] Filed: Feb. 3, 1994

[51] Int. Cl.$^6$ .................. E04H 15/00; F16B 17/00
[52] U.S. Cl. .................. 403/300; 403/165; 403/305; 403/361; 135/125
[58] Field of Search .......... 403/334, 292, 303, 300, 403/304, 309, 310, 313, 305, 361, 72, 73, 74, 165; 24/573.1; 135/104, 106, 109, 909

[56] References Cited

U.S. PATENT DOCUMENTS

| | | | |
|---|---|---|---|
| 1,753,041 | 4/1930 | Bourdon | 403/305 |
| 2,125,552 | 8/1938 | Feldhoff | 403/361 |
| 3,960,161 | 6/1976 | Norman . | |
| 3,990,463 | 11/1976 | Norman . | |
| 4,858,634 | 8/1989 | McLeese . | |
| 5,163,461 | 11/1992 | Ivanovich et al. . | |

*Primary Examiner*—Dave W. Arola
*Assistant Examiner*—Anthony Knight
*Attorney, Agent, or Firm*—Richard M. Saccocio

[57] ABSTRACT

A coupler for use in swivably independently securing the remote ends of a monofilament or wire, which wire is constantly in a cantilever bending motion at its remote end when folded and necessitates a freedom of rotation. The connector itself has a preferably cylindrical body having two tapered elongate nesting pockets which are separated from each other by an interior stop at the mid-portion of the connector cylindrical body. The elongate pockets are characterized by a taper which is dimensioned to receive and friction fittingly engage the remote ends of a wire or monofilament a spaced distance from the central stop of the connector cylindrical body. The method contemplates forming such a connector, and then after the wire or monofilament is coiled and slop fittingly engaged with the entire skin of the enclosure, placing one end of the connector over one free end of the wire or filament, and then bending the other end into alignment with the first fitted end and the opposite elongate pocket and inserting the same into the second pocket.

6 Claims, 2 Drawing Sheets

WIRE CONNECTOR AND METHOD

FIELD OF THE INVENTION

The present invention relates to a swivelable double connector for spring wires or monofilaments, and more particularly a connector which is used for a wire or monofilament which is coiled to provide the frame for a self-erecting shelter.

BACKGROUND OF INVENTION

The present invention is directed to self-erecting enclosures such as exemplified in the two Norman patents U.S. Pat. Nos. 3,960,161 and 3,990,463 and also as exemplified in McLeese patent U.S. Pat. No. 4,858,634 and Ivanovich, et al. U.S. Pat. No. 5,163,461 and specifically FIG. 2 of the subject Ivanovich patent U.S. Pat. No. 5,163,461.

In the self-erecting shelters as identified above, one or more resilient wire-like or monofilament structural members are employed in which the remote ends are looped through the interior structure of the enclosure and then joined by a connector. The one specifically shown in FIG. 2 of the Ivanovich patent U.S. Pat. No. 5,163,461 is a sleeve of relatively constant interior diameter and exterior diameter which is swedged permanently to one end of the wire or monofilament, and permits the other end to penetrate beyond a mid-portion of one-half of the interior and allegedly to swivel. With the McLeese patent U.S. Pat. No. 4,858,634 there is no showing of such a connector, but one is necessarily employed.

With the connector structures of the prior art which invariably are swedged to one end of the wire or monofilament and permit the other to find their own location interiorly, there is always the risk that the free end will engage the swedged end and become locked to each other which inhibits the free swiveling motion which is necessary. Moreover, with swedging the connector may loosen and slide off the end of the wire loop. Finally, swedging can only be done with a metal wire.

Indeed, for the efficient assembly of such an enclosure structure it is important that both ends of the wire or monofilament be capable of rotating or swiveling each independent of the other. In the course of opening and closing the enclosure, the movement of the monofilament or wire ends can be any motion of one end without the motion of the other. The reverse is true where the opposite end rotates and the remaining end holds steady. However, most commonly, during portions of the erecting and closing steps, both ends swivel independently in the connector, which is the most desirable.

Thus it is highly desirable to develop a connector structure which will nestingly receive the ends of the monofilament or wire for a self-erecting enclosure in such a manner that each can swivel independent of the other, and the connector can migrate to various positions interiorly of the enclosure without losing its nesting relationship to both ends of the wire or monofilament.

SUMMARY OF THE INVENTION

The present invention is directed to a coupler for use in swivably independently securing the remote ends of a monofilament or wire, which wire is constantly in a cantilever bending motion at its remote end when folded and necessitates a freedom of rotation. The connector itself has a preferably cylindrical body having two tapered elongate nesting pockets which are separated from each other by an interior stop at the mid-portion of the connector cylindrical body. The elongate pockets are characterized by a taper which is dimensioned to receive and frictionally fittingly engage the remote ends of a wire or monofilament a spaced distance from the central stop of the connector cylindrical body. The taper is such that when the monofilament wires or cables are inserted it will engage the ends at their otherwise abrupt corners and modify the end structure slightly to the end that it attempts to chamfer or radius the otherwise clean-cut end of the wire or monofilament so that the chamfer will frictionally rotate interiorly of the connector in the elongate pocket at a distance desirably at least 10% of the way from the bottom of the pocket to the exterior opening of the connector. The method of the invention contemplates forming such a connector, and then after the wire or monofilament is coiled and slip-fittingly engaged with the entire skin of the enclosure, placing one end of the connector over one free end of the wire or monofilament, and thereafter bending the other end into alignment with the first fitted end and the opposite elongate pocket and inserting the same into the second pocket.

In view of the foregoing, it is a principal object of the present invention to provide a unitary molded connector for use with wires or monofilaments in a self-erecting enclosure which can be economically molded because of tapers and uniformity of exterior and interior configuration, and yet which provides a free double swivel relationship between the two ends of the wire or monofilament.

Yet another object of the present invention is to provide a connector achieving the advantages set forth above which has a smooth exterior and can migrate to various positions interiorly of the enclosure structure without impeding the efficient function of the enclosure in its self-erecting function, or the take down function.

A further and important object of the invention is to provide such a connector which is equally friendly to glass pultruded monofilament or a capped wire.

BRIEF DESCRIPTION OF THE DRAWINGS

Further objects and advantages of the present invention will become apparent as the following description proceeds, taken in conjunction with the accompanying illustrative drawings, in which.

DESCRIPTION OF PREFERRED EMBODIMENT

Figure 1:
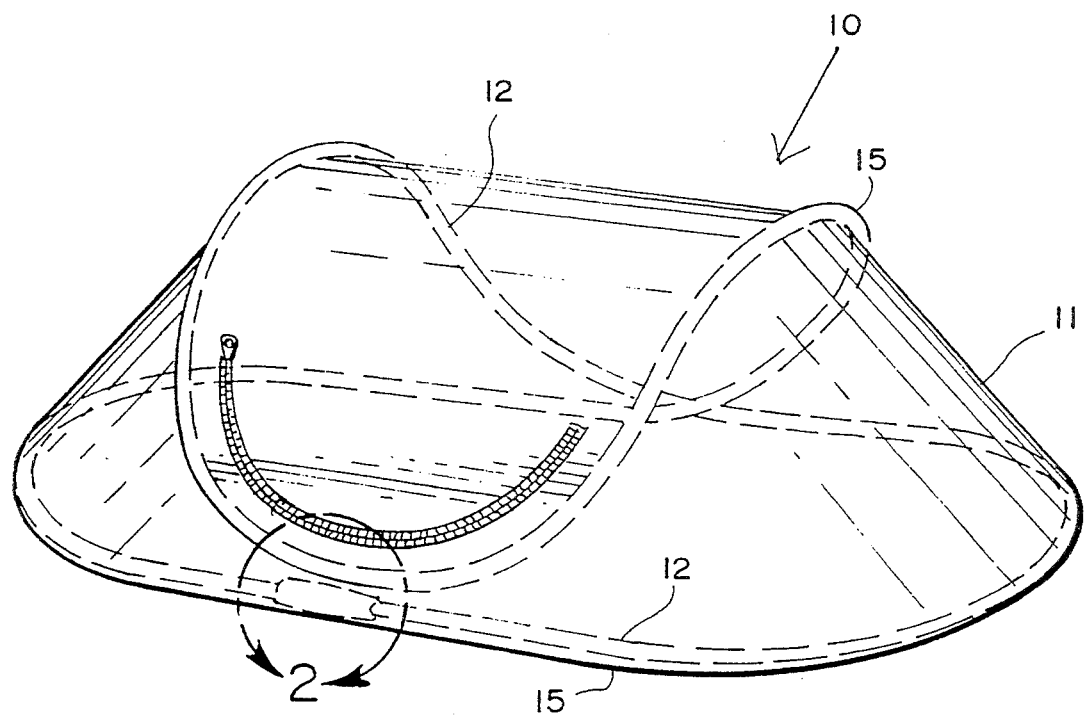
FIG. 1 is a perspective partially diagrammatic view of a self-erecting enclosure exemplary of the environment in which the connector of the present invention finds its best utility.

With reference to FIG. 1 of the drawings, it will be seen that an enclosure 10 having a skin 11 is formed to coact with a wire or monofilament 12 which monofilament is continuous and forms one single convoluted loop for insertion into sleeves 15 in the skin. The invention is directed to a connector 20 which serves to connect the two ends of the monofilament 12 after the same is inserted through the plurality of sleeves 15 to form the support for the skin 11.

In the function of self-erecting, the wire 12 when secured to a connector 20 intends to operate in several directions. With a fiberglass type monofilament, the action at both ends of the monofilament is somewhat torsional in 360° in addition to a longitudinally inspired thrust and cantilever action.

Figure 2:
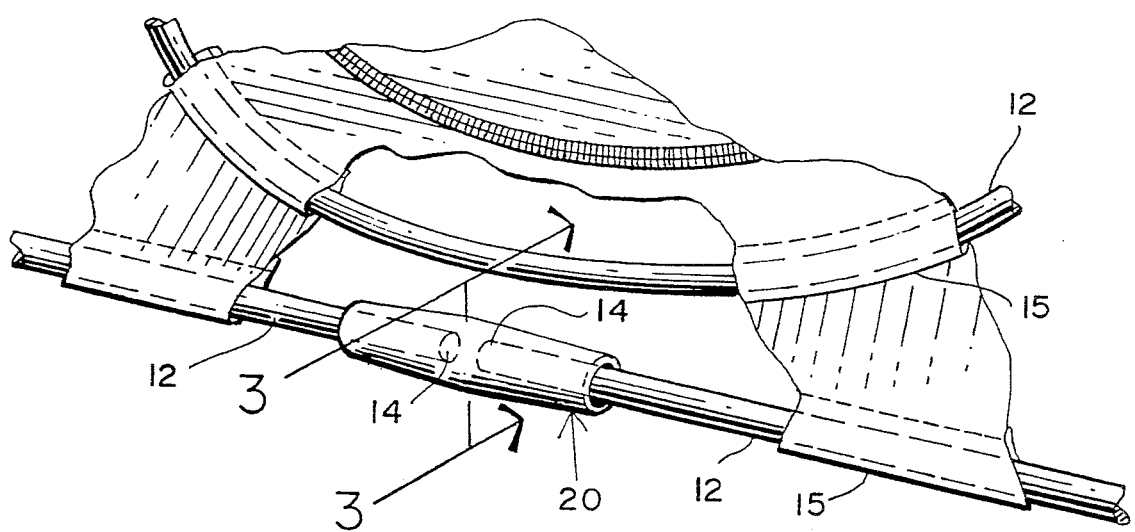
FIG. 2 is an enlarged view of that portion identified in the phantom circle in FIG. 1 by the reference numeral 2.

With the prior art such as FIG. 2 of the Ivanovich patent U.S. Pat. No. 5,163,461, one end of the monofilament or wire is rigidly secured by swedging to the connector, and the other end is permitted in an uninhibited fashion to wander around through the other interior portion. When in deep thrust, this puts the two ends of the wire or monofilament in rotational contact which can result in the two wires actually freezing one against the other, and inhibiting, if not eliminating, the ability of either or both ends.

The connector 20 of the present invention addresses this problem by providing for a unitary connector body 21 which is formed in essentially a cylindrical fashion, optionally having an exterior taper and mandatorily having an interior taper where the interior provides for two deep pockets 22 which extend towards each other but have a pocket end wall stop 24 which precludes the ends of the wire or monofilament 12 from contacting each other.

Figure 3:
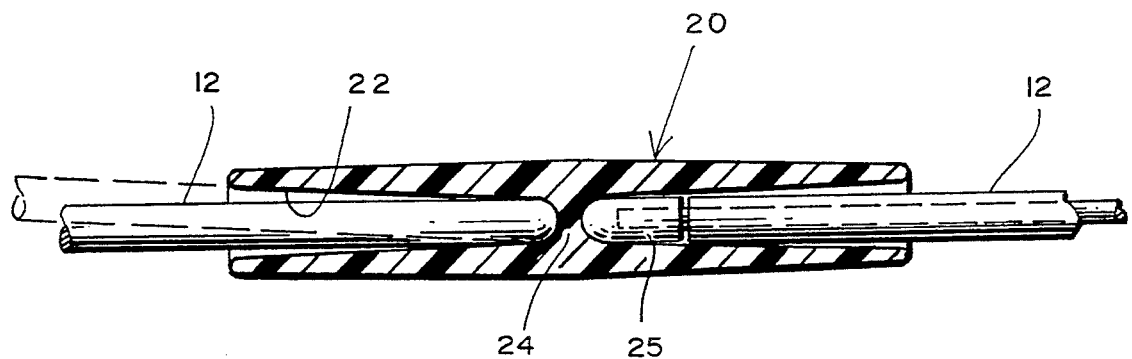
FIG. 3 is a longitudinal sectional view of the illustrative connector in which both wires and/or monofilament are inserted, with the righthand side illustrating a wire, and the lefthand side illustrating a monofilament.
Figure 4:
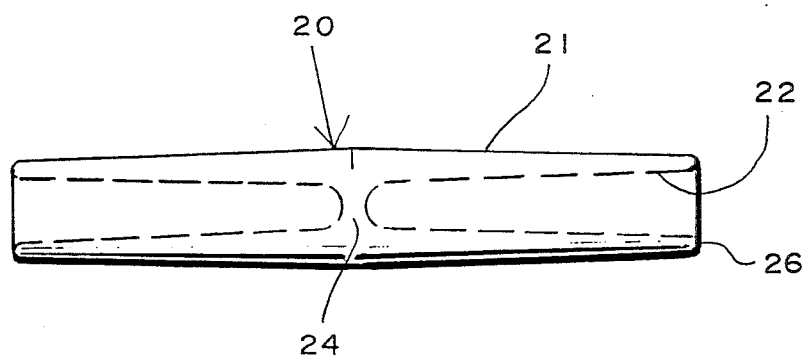
FIG. 4 is a longitudinal transverse view of the subject connector bearing reference numerals to its principal dimensions which are identified in the descriptive material in the specification.
Figure 5:
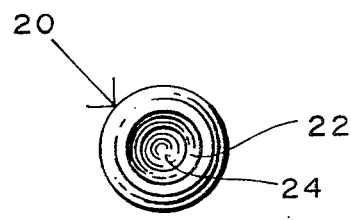
FIG. 5 is an end view of one end of the connector shown in FIG. 4 illustrating the configuration of the end and the taper of the elongate pocket and including reference numerals to various dimensions which are identified in the specification.

As best shown in FIG. 3, it will be seen that diagrammatically when the wire is placed inside the pocket 22 of the connector 20, desirably an end cap 25 slips over the end of the wire which permits a frictional fit and rotation interiorly of the pocket 21. When a monofilament is employed, this is unnecessary. Best results have been achieved with a monofilament which is a pull-truded glass rod covered with a vinyl ester polymer. With the monofilament as just described, the sharp circumferential end portions become slightly radiused in use thereby contributing to the smooth friction fit which will permit either end of the monofilament to swivel independently of the other end, or both to swivel simultaneously without being dislodged from the connector.

The connector is made of a polycarbonate, and more specifically Lexan which is a trademark of General Electric Plastics. The desirable length on a commercial embodiment is 4.5 inches, with 0.200" separation between the end portions of the tapered pockets. The diameter of the cylindrical body 21 of the connector 20 approximates 0.700 inches, with the taper throughout the 2.150 inch pocket going from an exterior diameter of 0.400 inches to an interior diameter adjacent the bottom of the pocket of 0.320 inches. The exterior portion as shown has a radius 26 which approximates 0.050 inches at both ends. This radius accommodates a monofilament having a diameter in the range of 0.196 to 0.300 inches which will normally penetrate to a depth of 2.100 inches interiorly of the tapered pocket 21. The taper of the pockets is desirably in the range of 1° to 5° per side. Optionally the body of the connector 20 tapers on the outside to a maximum diameter which is at that portion surrounding the endwall stop 24.

In the method of manufacturing, the monofilament is woven through the various sleeves 15 of the skin 11 until the two remote ends 14 are brought together. Thereafter the connector can be manually slipped over one end, and with the help of a jig, the other end aligned with the first end and the remote end of the monofilament is inserted into the connector 20. The nature of the operation of the monofilament or wire is such that it will tend to seat itself into the connector 20. The risk of dislodgement is minimal. On the other hand, by providing complete freedom of swiveling of each end interdependent of the other end, the self-erecting function is enhanced, and the closing function is also enhanced.

Although particular embodiments of the invention have been shown and described in full here, there is no intention to thereby limit the invention to the details of such embodiments. On the contrary, the intention is to cover all modifications, alternatives, embodiments, usages and equivalents as fall within the spirit and scope of the present invention, specification and appended claims.

What is claimed is:

1. For use with a self-erecting enclosure having a skin, and a flexible monofilament loop having two ends positioned through various sleeves in the skin to provide for self-erection, a connector for the two ends of the loop comprising:
   a connector elongate body of essentially cylindrical cross-section,
   opposed uninterrupted pockets extending centrally from the exterior of both ends of the cylindrical body,
   said uninterrupted pockets having a taper,
   a pocket end wall stop at a mid-portion of the connector body having a wall thickness adequate to preclude the penetration of one or the other ends of the monofilament from engaging each other, said ends frictionally engaged in said pockets, whereby the subject connector will securely receive, removably secure, and independently swivelably constrain the two ends of a loop inserted into the respective opposed pockets of the connector to facilitate manufacture, erection, and folding of an enclosure.

2. In the connector of claim 1,
   said end wall stop having a thickness of at least 0.200".

3. In the connector of claim 1,
   said body having an outer taper with maximum thickness surrounding the end wall stop.

4. In the connector of claim 1,
   said pockets having a taper in the range of 1° to 5°.

5. The method of employing a monofilament interiorly of an enclosure skin having a plurality of sleeves for receiving the monofilament in such a fashion that the enclosure when folded can be thrown into the air and the enclosure will self-erect and similarly provide for folding including the following steps:
   passing the monofilament through the predetermined sleeves in the skin until one end of the monofilament is in close proximity to the other end,
   passing a coupler formed to have two opposed tapered pockets to swivelably receive the opposite ends of the monofilament over one end of the monofilament, and thereafter inserting the other end of the monofilament into the opposing tapered pocket, whereby the monofilament is permitted to swivel at either of its ends in the process of being erected or folded independently of the position of the other end inside of the connector.

6. For use with a self-erecting enclosure having a skin, the combination of a flexible monofilament loop having two ends positioned through various sleeves in the skin of the enclosure to provide for self-erection, and a connector for the ends of the loop comprising:
   a flexible loop having two ends,
   a connector elongate body of essentially cylindrical cross-section,
   opposed pockets extending centrally from the exterior of both ends of the cylindrical body,
   said pockets having a taper,
   a pocket end wall stop at a mid-portion of the connector body having a wall thickness adequate to preclude the penetration of one or the other ends of the monofilament from engaging each other, said ends frictionally engaged in said pockets, whereby the subject connector will removably receive and independently swivelably constrain the two ends of the loop when inserted into the respective opposed pockets of the connector to facilitate manufacture, erection, and folding of the portable enclosure.

* * * * *